Patented Sept. 29, 1925.

1,555,078

UNITED STATES PATENT OFFICE.

FREDERICK DUNCAN STRUAN ROBERTSON, OF TORONTO, ONTARIO, CANADA, ASSIGNOR, BY MESNE ASSIGNMENTS, TO JOHN P. SCOTT, OF TORONTO, CANADA.

TREATMENT OF SULPHIDIC AND OTHER ORES, MATTES, RESIDUES, ETC.

No Drawing. Application filed August 29, 1919, Serial No. 320,651. Renewed February 6, 1925.

*To all whom it may concern:*

Be it known that I, FREDERICK D. S. ROBERTSON, citizen of Great Britain, residing at Toronto, county of York, Province of Ontario, have invented certain new and useful Improvements in the Treatment of Sulphidic and Other Ores, Mattes, Residues, Etc.; and I do hereby declare the following to be a full, clear, and exact description of the invention, such as will enable others skilled in the art to which it appertains, to make and use the same.

This invention relates to treatment of sulphidic and other ores, mattes, residues, etc. More particularly the invention has to do with a process of obtaining metal from ores in which the metal values are present wholly, mainly, or to a substantial extent, in the form of sulphides. In its more specific aspects, the invention is especially concerned with the treatment of iron sulphide ores such as pyrites, pyrrhotite, and the like, in such manner as to obtain directly from the unroasted ore, metallic iron low in sulphur; while the sulphur of the ore is recoverable largely in the free or uncombined state. Certain phases of the invention extend also to treatment of arsenids, antimonids, etc., as well as sulphides, as will more fully appear hereinafter.

Described in general terms, the process of the present invention comprises heating an ore of the character described in a reducing atmosphere, and under such conditions that the metal or metals of the ore is or are obtained as such, while the characteristic non-metallic constituent or constituents of the ore such as sulphur, or the like, originally in combination with the metal or metals, may pass off to a considerable extent in free condition.

Without limiting the invention to any specific procedure or to the treatment of any particular ore, but in order to afford a full understanding of the principles of the invention by means of an illustrative example, a method of treating iron pyrites in accordance with the invention, for direct or indirect production of free sulphur and metallic iron, will now be described.

Iron pyrites ($FeS_2$) containing in the neighborhood of 35 to 40 per cent sulphur, for example, and in finely divided condition, without admixture of fuel or flux, is caused to pass at a regulable rate, through an appropriate reaction chamber, against a counter-flowing current of a highly reducing gas, the operation being conducted at a temperature high enough to effect the desired reaction, and above the distillation point of sulphur, but most desirably not high enough to cause complete fusion of the resultant metal. In practice, temperatures ranging from about 750° to 900° C. are found to be especially suitable. The heating of the ore is accomplished indirectly; that is, the ore must not be subjected to the action of a fuel flame. For example, the chamber through which the ore passes may be externally heated; or the reducing gas may be preheated to the necessary extent before being brought into contact with the ore. If electrical heating be employed, the ore may be directly heated, of course. Agitation of the ore during the treatment is desirable as promoting the rapidity and completeness of the reaction. The reducing gas used may be a single gas or a mixture. Hydrogen alone, and most desirably electrolytic hydrogen, is very effective and in some respects is to be preferred, especially because its use favors simplicity of reaction and freedom from complicating factors. Other hydrogenous reducing gases such as producer gas, water gas, and the like, characterized by varying proportions of carbon monoxid in mixture with hydrogen may be often employed to advantage; and even natural gas, or other hydrocarbon gas may be used. For best results, a large excess of reducing gas should be passed through or in contact with the ore in order to sweep out the reaction products and to guard against reverse or complicating reactions. In practice it is best to employ at least eight to ten times the amount of reducing gas theoretically required.

Under the described conditions of operation, practically all of the sulphur of the ore may be driven off, partly as free or elemental sulphur, and partly as hydrogen sulphide. Where the ore contains more or less iron oxid, the water vapor resulting from its reduction is beneficial in preventing loss of sulphur as COS, where the reducing gas contains carbon monoxid. In the absence of oxids, a small amount of steam may be mixed with the reducing gas to effect this result, if desired. The free sulphur swept out of the reaction chamber with the excess of reducing gas may be recovered as such in any suitable manner, as by means of bag filters, for example; while any hydrogen sulphide present may be decomposed into hydrogen and free sulphur by subjecting the gas in a superheater preferably after passage through the bag filters, to a temperature of 1000° C. or higher. In this way hydrogen used up by combining with sulphur may be regenerated and re-used, along with the rest of the excess reducing gas, in treating further quantities of ore. This recovery of hydrogen from the $H_2S$ and its return to the system for re-use is of substantial economic importance where the amount of hydrogen sulphide is at all large, especially where the hydrogen employed is produced electrolytically or by some form of iron sponge method; and such recovery and re-use constitute an important feature of my invention in a preferred embodiment thereof.

The desulphurized ore material resulting from the described treatment of the sulphide ore, iron pyrites in the case assumed, consists of metallic iron, generally in a spongy and sometimes partly sintered condition, but not actually fused, accompanied by more or less gangue material which is commonly silicious in character. This material should be carefully protected by a reducing or non-oxidizing atmosphere while hot, since the desulphurized metal is extremely pyrophoric.

Operating as described on iron pyrites of the character specified in the foregoing typical example, it is entirely feasible to obtain metallic iron having a sulphur content of less than 0.3 per cent, and similar results are attainable with other sulphide ores. This reduced metal requires only to be melted down under suitable conditions to separate it from the accompanying gangue and to effect such further refining as may be considered necessary to adapt it for use in various ways, as for instance in the manufacture of alloy steels.

It will be observed that the method herein described is effective to eliminate not only the so-called "feeble" sulphur atom of pyrites, but also a large proportion of the remaining sulphur present in more stable combination, and that the operating conditions are essentially non-oxidizing with respect not only to the sulphur, but also to the metal of the ore. This is in contradistinction to methods heretofore proposed in which iron pyrites or the like has been subjected to the action of a so-called non-oxidizing flame, or in general to the action of an atmosphere containing a reducing gas, under conditions permitting elimination of considerable sulphur in elemental form but with production of iron oxid.

Other sulphidic ores of iron, whether the iron be present as pyrites, pyrrhotite, or other form of sulphide, and in which the percentage of sulphur varies widely, may be successfully treated by the present process.

It is not intended, however, to include within the expression sulphidic ores, any ores running less than say one per cent of sulphur present as sulphide.

A very important practical application of the new process is in the treatment of sulphide ores of iron and other metals which are too low in sulphur to be treated by pyritic smelting. Such ores which often cannot be profitably worked by any method available heretofore, can be readily desulphurized at a cost not to exceed the market value of the free sulphur recoverable directly or indirectly, while the resultant metal is a very high grade soft iron.

The invention has been described more particularly with reference to sulphidic ores of iron, but sulphidic ores of other metals may also be successfully treated in the manner described. Thus molybdenite ($MoS_2$) parts with its sulphur, largely in elemental form, and yields metallic molybdenum when treated by the present method. Complex sulphide ores of lead and zinc, which are difficult to smelt by other methods, can also be satisfactorily treated by my new method. By subjecting such ores to sufficiently high temperatures, say 750° to 900° C., in a hydrogen atmosphere, the sulphur content may be substantially eliminated and recovered, without the attendant oxidation and volatilization of the zinc and lead content invariably occurring in the methods of treatment heretofore in vogue.

It may also be noted here that pyritic or pyrrhotitic iron ores containing chalcopyrite yield substantially their entire sulphur content when treated in accordance with my new process. When such ores are smelted in the usual ways, the sulphur of the chalcopyrite resists treatment and is largely unavailable. For this reason such ores are penalized at the smelters.

The invention also extends to the treatment of arsenical ores, mattes, etc., such as those of nickel and cobalt. In treating these ores in accordance with the invention, the arsenic behaves in a manner more or less analogous to sulphur, being driven off partly in elemental condition as an easily condensable vapor, and partly in combination with hydrogen as arsine. Such arsine as may be produced when the reducing gas is high in hydrogen, may be decomposed by superheating, and the hydrogen recovered for re-use as before.

Where desirable or convenient the operation of melting down the desulphurized or de-arsenated metal and gangue with fluxes etc. may take place immediately without any intermediate cooling down of the desulphurized material, the final treatment being so conducted that the operations of desulphurizing and melting down take place as steps in a smoothly continuous process. Moreover, since the melting down should ordinarily be conducted in a reducing atmosphere, the reducing gas to be used for the desulphurizing operation may be preheated in the melting down chamber or zone, which latter may therefore be included in the gas circuit and may receive excess and recovered hydrogen discharged from the desulphurizing chamber. The melting down or smelting may advantageously be carried out in an electric furnace, the freedom of the desulphurized metal from carbon and other usual impurities or modifying constituents rendering it particularly adapted for electric furnace treatment in the production of special alloys.

In its broader aspects the invention is not necessarily limited to a procedure in which removal of sulphur, arsenic, or the like from the ore or other material, is effected at temperatures below the fusing point of the metal or other material. Thus without undergoing any preliminary treatment the ore mixed with suitable fluxing material may be smelted in an electric furnace, for example, in the presence of a strongly reducing hydrogenous atmosphere. Under these conditions most of the sulphur, for instance, distils off in elemental form, while some, though comparatively little at the high temperatures of smelting, may combine with hydrogen. By continuously sweeping a current of the reducing gas through the furnace, as by introducing it below the surface of the melting or molten mass, the reaction products can be carried out of the furnace, a large proportion of the sulphur recovered as such, and the excess of reducing gas returned to the furnace.

In still another embodiment of the broad invention, the excess of reducing gas, instead of being returned in circuit for re-use, is caused to act on further portions of ore in series or succession, until its effectiveness is so diminished that it can be discharged to waste after removal of sulphur. It is to be understood that removal of sulphur in this instance as well as in the other embodiments of the broad invention herein described, assuming the treatment of a sulphide ore, does not necessarily mean more than the removal of the free or uncombined sulphur carried by the effluent reducing gas. Whether or not the gas will be treated for decomposition of its contained hydrogen sulphide will depend in any given instance upon whether the concentration of $H_2S$ in the gas is sufficiently high to interfere seriously with the desulphurizing operation, and whether such decomposition of $H_2S$ and recovery of its constituent elements is economically required.

What I claim is:—

1. The process of treating metalliferous material containing a metal sulphide, arsenid, or the like, or mixtures of such compounds, which comprises heating such material in an atmosphere reducing toward the metal or metals of said material, at a temperature sufficiently high and for a period of time sufficiently long to remove substantially all the sulphur, arsenic, or the like content of said material partly in elemental condition, and obtaining a product in which the metal value is present in the metallic state and is substantially unoxidized.

2. The process of treating sulphide ores and the like which comprises heating such an ore or the like to above the distilling point of sulphur in a current of a reducing gas which is non-oxidizing toward the metal of the ore, until substantially all the sulphur is removed, and obtaining metal in substantially unoxidized condition.

3. The process of treating sulphide ores and the like which comprises passing a stream of reducing gas, high in hydrogen and non-oxidizing toward the metal of the ore or other metalliferous material in contact with a mass of said ore or other material heated to a temperature high enough to remove sulphur but below the fusing temperature of the metal, conducting away the resultant fumes and obtaining metal in substantially unoxidized condition.

4. The process of treating sulphide ores and the like which comprises heating such an ore to a temperature high enough to remove sulphur while passing an excess of a reducing gas non-oxidizing toward both sulphur and the ore metal in contact with the heated ore, conducting away effluent gases including the excess of reducing gas and separating sulphur therefrom, and returning the so-treated gases for re-use.

5. The process of treating sulphide ores of iron which comprises heating such an ore to a temperature sufficiently high to remove sulphur while subjecting the ore to the action of a current of reducing gas non-oxidizing toward both iron and sulphur, conducting away effluent gases including the excess of reducing gas and separating sulphur therefrom, and obtaining material containing metallic iron as another product of the ore treatment.

6. The process of treating ores and the like containing sulphidic, arsenical, or similar compounds of metals or mixtures of such compounds which comprises heating such ore or other material in a current of reducing gas to a temperature sufficiently high to remove sulphur, arsenic, and the like, and set free the metal or metals of the material, conducting away effluent gases including the excess of reducing gas, removing constituents such as sulphur and arsenic therefrom, and re-using the purified gases for treatment of more material.

In testimony whereof I hereunto affix my signature.

FREDERICK DUNCAN STRUAN ROBERTSON.